June 20, 1933.  W. F. FRASER  1,914,561
CAM GRINDING APPARATUS
Original Filed April 27, 1927   6 Sheets-Sheet 1
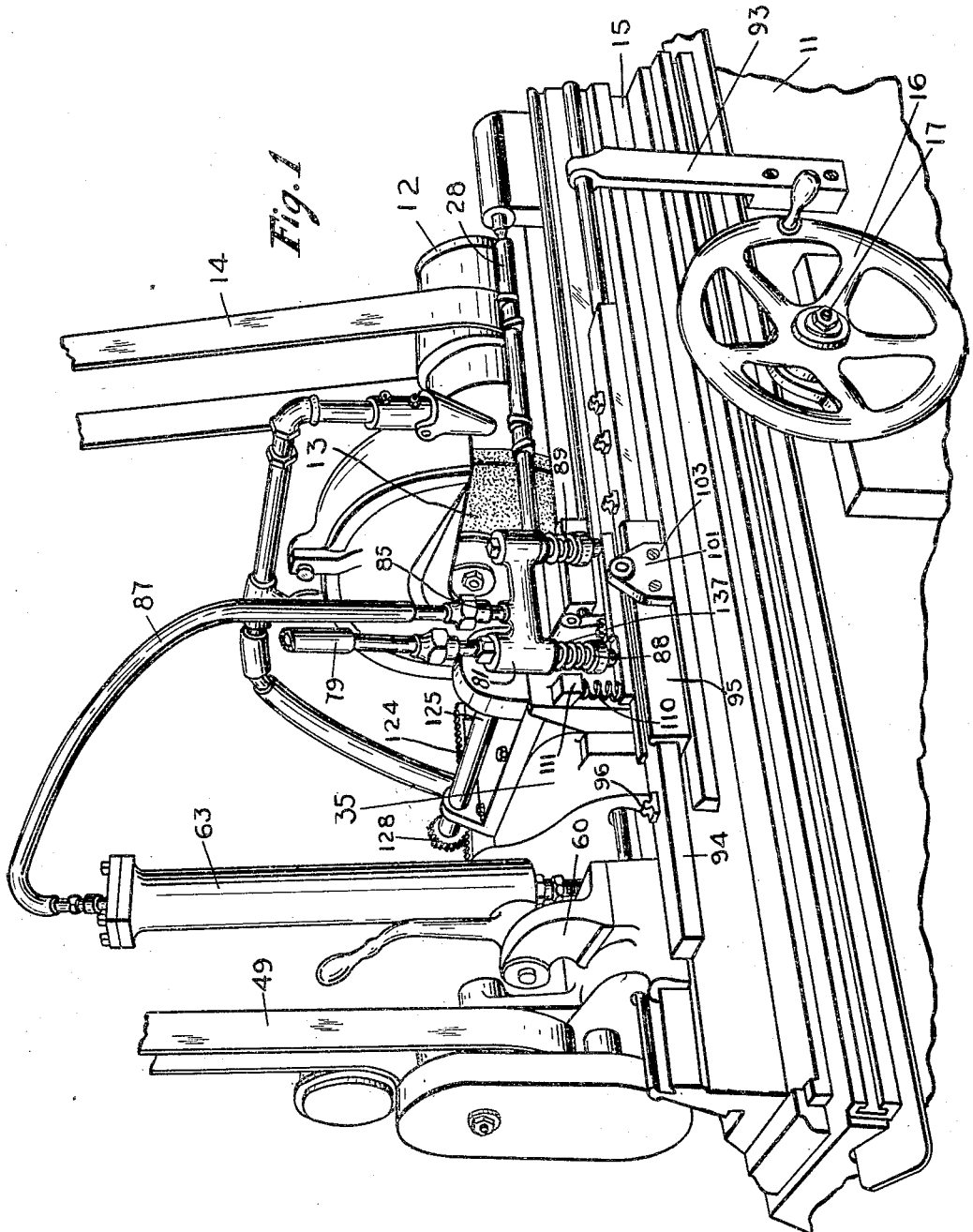
WITNESSES
W. R. Greenwood
Harold W. Eaton
INVENTOR
WARREN F. FRASER
BY Clayton R. Jenks
ATTORNEY June 20, 1933.   W. F. FRASER   1,914,561
CAM GRINDING APPARATUS
Original Filed April 27, 1927   6 Sheets-Sheet 2
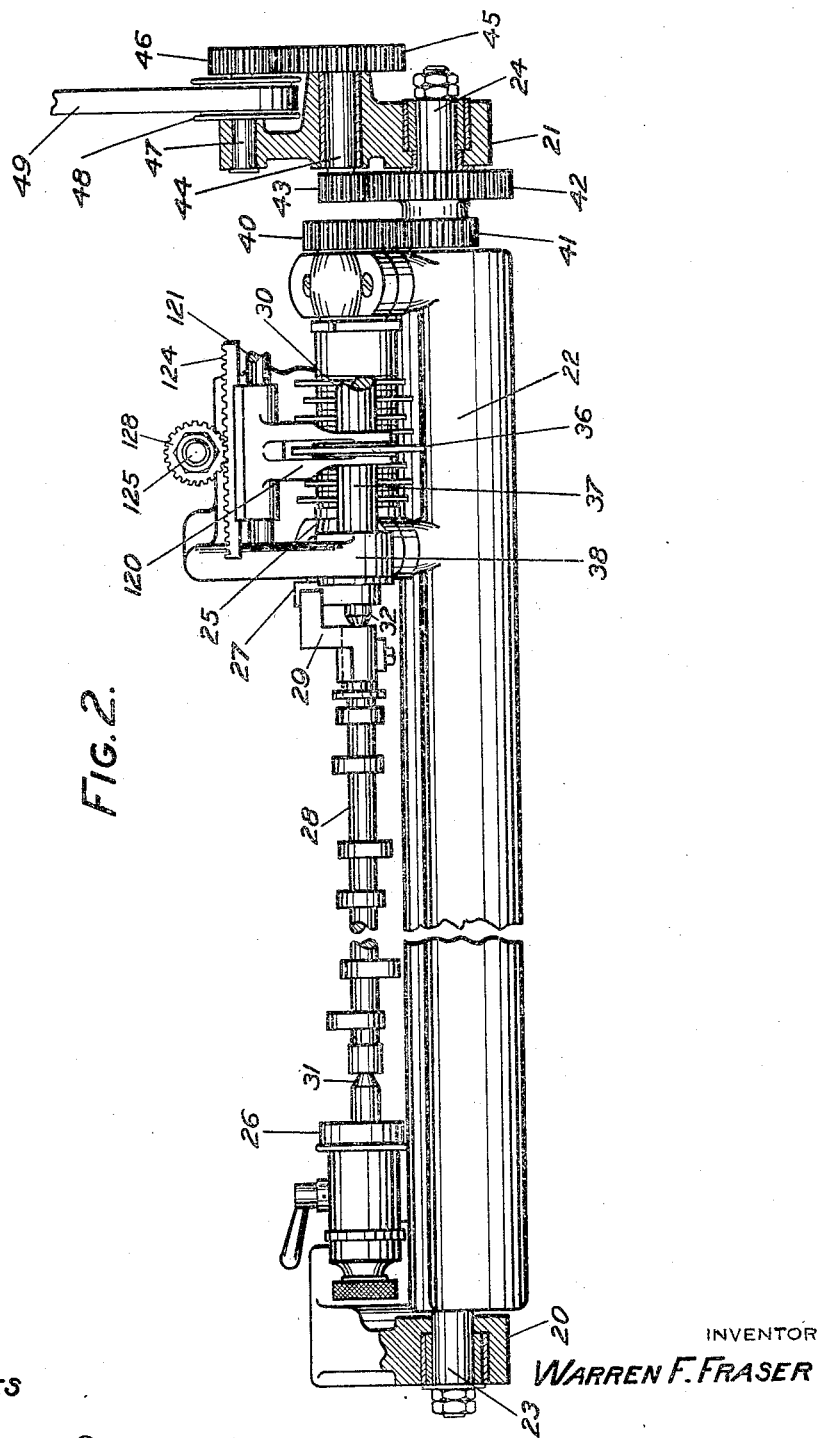
WITNESSES
Franklin E. Johnson
Harold W. Eaton
INVENTOR
WARREN F. FRASER
BY Clayton L. Jenks
ATTORNEY

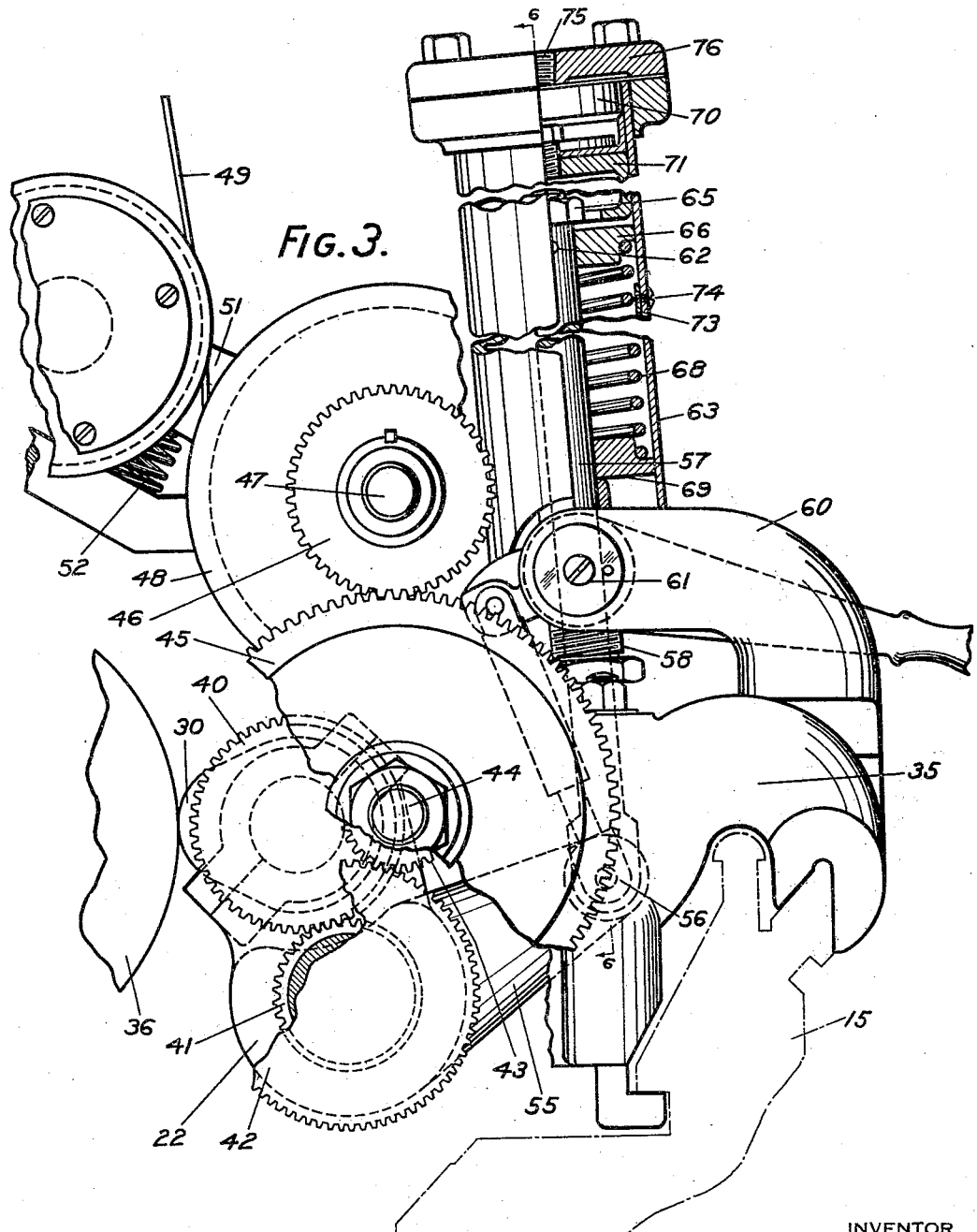

June 20, 1933.     W. F. FRASER     1,914,561
CAM GRINDING APPARATUS
Original Filed April 27, 1927     6 Sheets-Sheet 4
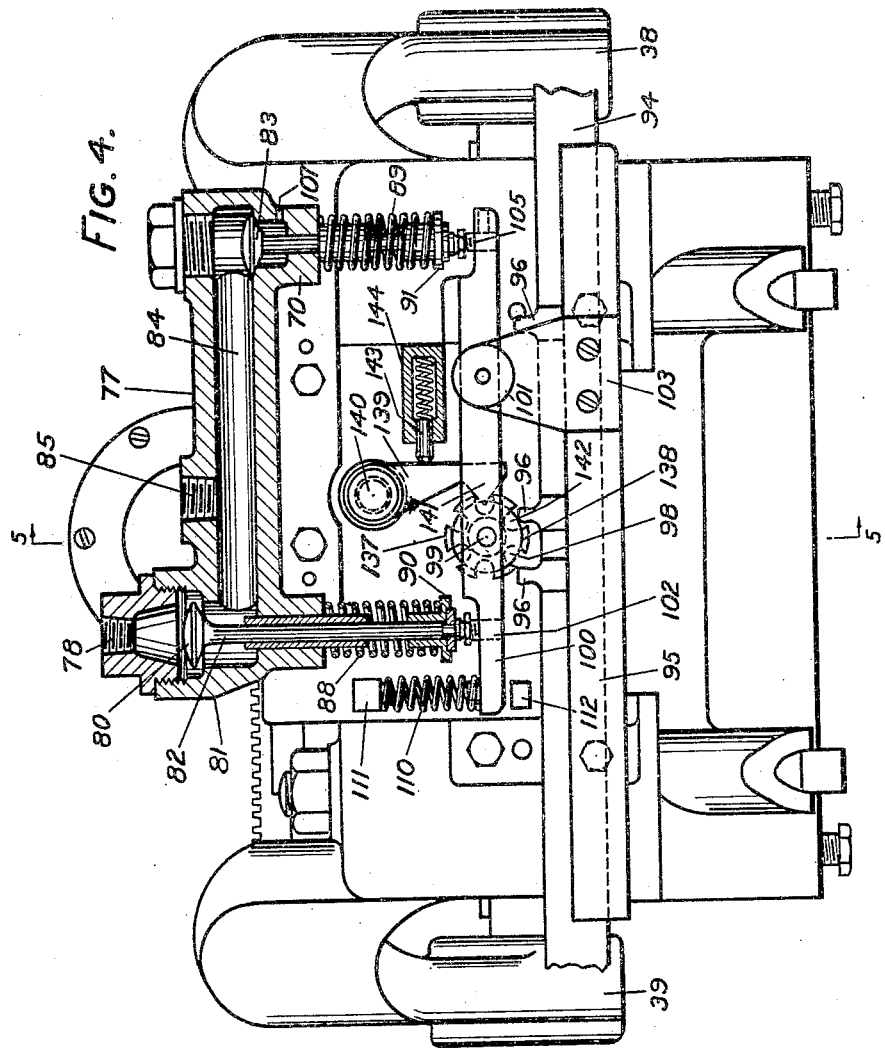
WITNESSES
Franklin E. Johnson
Harold W. Eaton
INVENTOR
WARREN F. FRASER
BY Clayton R. Jenks
ATTORNEY

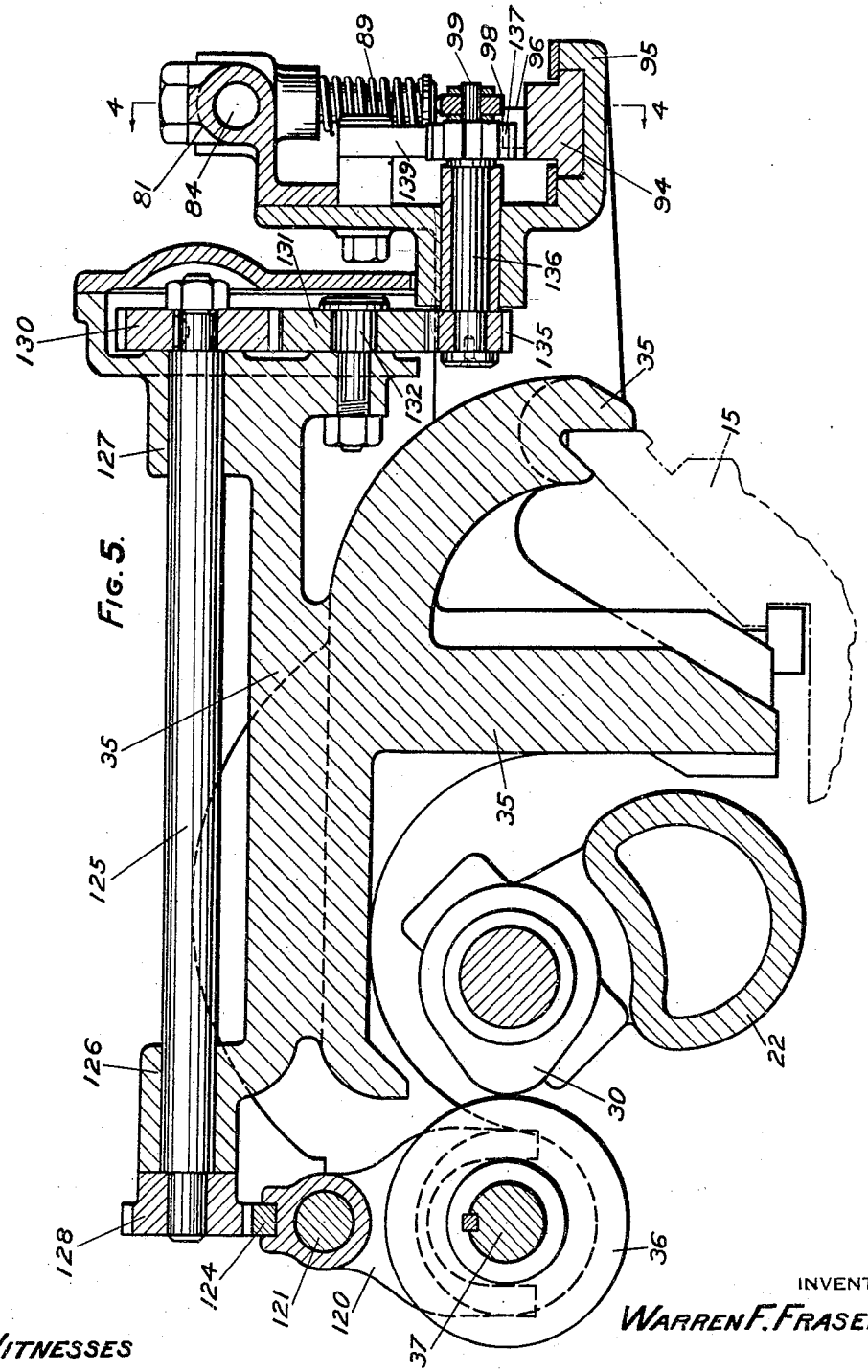

June 20, 1933. W. F. FRASER 1,914,561
CAM GRINDING APPARATUS
Original Filed April 27, 1927 6 Sheets-Sheet 6
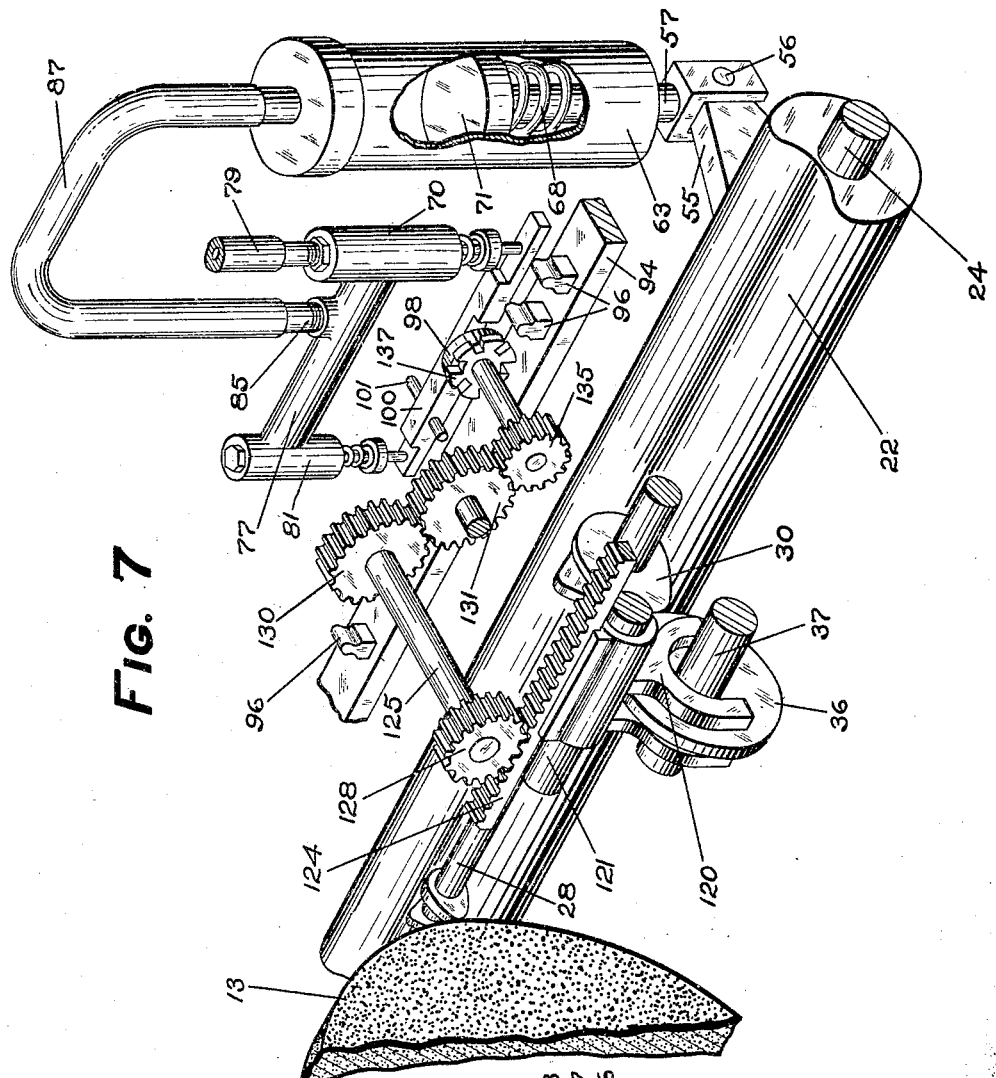
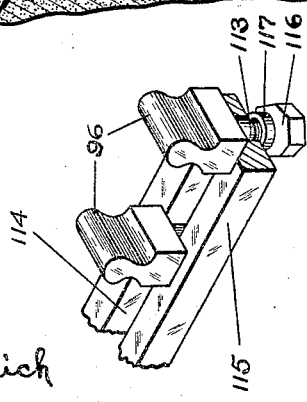
WITNESSES
Edward H. Goodrich
Harold W. Eaton
INVENTOR
WARREN F. FRASER
BY Clayton R. Jenks
ATTORNEY Patented June 20, 1933

1,914,561

UNITED STATES PATENT OFFICE

WARREN F. FRASER, OF WESTBORO, MASSACHUSETTS, ASSIGNOR TO NORTON COMPANY, OF WORCESTER, MASSACHUSETTS, A CORPORATION OF MASSACHUSETTS

CAM GRINDING APPARATUS

Original application filed April 27, 1927, Serial No. 187,067. Divided and this application filed August 17, 1929. Serial No. 386,666.

This invention relates to a grinding machine and more particularly to a machine for grinding irregularly shaped objects such as cams and the like.

Heretofore various mechanisms have been devised for the grinding of cams and other irregularly shaped objects in which the object to be ground is mounted on centers and either the grinding wheel or the object to be ground is rocked relative to the other part. The rocking movement is controlled by means of a master cam or form to give the desired shape to the finished object. These mechanisms have comprising arrangements for grinding a single object or in many cases for grinding cam shafts such as used in the modern gas engines in which a plurality of cams are integrally formed on a shaft. For grinding a plurality of cams on a single shaft, a master cam shaft has been employed which has a series of master cams arranged to form the successive cams on the cam shaft.

Heretofore, an apparatus of the type shown in the prior patent to Dunbar et al. No. 1,339,746 of May 11, 1920 has been devised for the grinding of cam shafts in which the master cam follower is automatically shifted axially into alignment with successive master cams by the traversing movement of the work supporting table. This mechanism, however, is of limited practical utility inasmuch as it is only adapted for use where the master cams are equally spaced on the master cam shaft and the cam blanks are equally spaced on the cam shaft being ground or the master cams are unequally spaced in the same proportion as the cam blank on the cam shaft which increases the length and cost of the machine required. In the design of the cam shaft such as used in the modern automobile, the cam blanks are unequally spaced on the cam shaft. The cams are usually grouped in pairs; that is, an intake and exhaust cam adjacent each cylinder, and these pairs are unequally spaced from each other. It is desirable to have the master cams closely and equally spaced from each other on the master cam shaft.

It is accordingly one object of the invention to provide a cam grinding apparatus which will serve to position the master cam follower in operative relation with the proper master cam corresponding to the cam to be ground, without requiring skillful attention on the part of the operator, when he shifts the grinding wheel from one cam blank to another.

It is another object of my invention to provide a cam grinding machine in which the master cam follower is moved axially through an equal distance into alignment with successive master cams while the work supporting table is traversed through an unequal distance to position successive cam blanks on the cam shaft in operative position relative to the grinding wheel.

It is frequently necessary or desirable to grind, one at a time, a plurality of round surfaces on a single piece of work. If the work pieces are irregularly shaped, as in the case of a set of cams on a cam shaft, then it is particularly necessary that the work be removed to a considerable distance from its operative relation with the wheel after one surface has been finished and before the table is traversed to position a second work surface in front of the wheel. If this is accomplished solely by means of the wheel cross feed mechanism, a considerable waste of time is involved, owing to the slowness with which the wheel is moved and the distance which it may have to travel. It is therefore desirable, for various types of grinding machines in which a number of work surfaces are to be ground, that the work itself be moved away from the wheel after each surface has been finished and then returned to a proper grinding position.

In the operation of the previous machines in common use in cam grinding, the operator had to perform six distinct operations for each cam ground, namely, to separate the master cam and roller, to move the master roller axially into engagement with the desired master cam, to traverse the table to bring the proper cam blank into operative position in front of the grinding wheel, to bring the master cam and roller into operative engagement, to feed the grinding wheel and cam blank relatively toward each other to grind the cam blank to the desired size and to separate the grinding wheel and cam blank after the completion of the grinding operation.

These previous constructions were not foolproof but required skilled operators and extreme care to properly position and align the roller and master cams. Correct longitudinal traverse of the work table was also necessary to move the corresponding cam blank into contact with the grinding wheel.

Under these conditions it would be easy to spoil the cam shaft through the misplacement of the cam roller opposite the incorrect master cam or by improper traverse of the table so as to move the wrong cam blank on the cam shaft into operative contact with the grinding wheel.

It is accordingly a further object of this invention to provide a grinding machine in which the work is moved out of its operative position relative to the grinding wheel when it is to be traversed longitudinally past the wheel face so that a new surface to be ground may be presented to the wheel without danger of injuring the work.

It is an object of this invention to provide a simplified controlling mechanism for a grinding machine which will require less skill and attention by the operator in grinding the cam shaft and which reduces the number of operations required of the operator for each cam ground.

It is a further object of the invention to provide a machine so constructed and arranged that the gripping and movement of a single hand wheel will control the relative traversing motion existing between the grinding wheel and the cam shaft support simultaneously with all the operation necessary for the progressive movement of the master cam roller into successive alignment and operative contact with each master cam respectively.

Other objects will be apparent from the following disclosure. I have disclosed in the drawings one embodiment of the invention in which like reference numerals indicate like parts:

Figure 1 is a fragmentary perspective view showing the improved cam attachment mounted on the table of a cylindrical grinding machine;

Fig. 2 is a fragmentary rear view showing the cam grinding attachment having parts broken away and shown in section to more clearly illustrate the construction;

Fig. 3 is an enlarged fragmentary end view of the cam grinding attachment having parts broken away and shown in section to more clearly illustrate the construction;

Fig. 4 is an enlarged view of the headstock end of the attachment as viewed from the front of the machine with the valve mechanism shown in section. This view is taken substantially on the line 4—4 of Fig. 5;

Fig. 5 is an enlarged cross-sectional view taken substantially on the line 5—5 of Fig. 4;

Fig. 6 is a cross-sectional view through the cylinder mechanism taken approximately on the line 6—6 of Fig. 3;

Fig. 7 is a diagrammatic isometric view of the main parts of the mechanism, showing the operation thereof; and Fig. 8 is a fragmentary detail view of a modified form of dog construction in which the dogs are adjustable.

In accordance with my invention I have provided a machine for grinding the blanks on a cam shaft in which the grinding wheel and a cam blank are moved relatively towards and from each other to grind the desired contour on the blank by means of a master cam and follower suitably connected for this purpose. Ordinarily the cam blanks are not evenly spaced on the cam shaft, but it is desirable to have the master cams closely and evenly spaced. When the grinding wheel and cam shaft are moved relatively to bring a second cam blank into operative position relative to the grinding wheel, it is necessary that the master cams and the follower be similarly shifted so that the proper master cam will be in operative position for grinding the new blank. My invention contemplates an apparatus in which the relative shifting of the grinding wheel and work automatically causes the follower to be located in front of the proper master cam. My preferred construction is one in which the relative transverse movement between the grinding wheel and the cam blanks causes the follower to be removed from the master cam in timed relation with the work shifting movement and then to be moved to a position in front of the master cam which corresponds with the cam next to be ground. I also preferably mount the work on a table slidable transversely past the grinding wheel and I arrange a suitable mechanism for feeding the grinding wheel into the work, but the grinding action to secure the desired cam contour is accomplished by mounting the cam blanks on a movable support which preferably rocks towards and from the grinding wheel. To secure this rocking movement, the master cams may be mounted on the rocking support and are preferably in axial alignment with the cam blanks to which they are suitably connected so that the parts may rotate together. The cam follower is mounted on a stationary part of the machine, such as the table, so that as the cam blanks and the master cam rotate, such rotation through the action of the follower causes the grinding wheel to grind the blank to a contour corresponding with that of the master cam. In accordance with the form illustrated, this apparatus may comprise an attachment to be applied to a cylindrical grinding machine of the usual well-known type, which has a grinding wheel mounted on a wheel slide adapted for transverse movement of the base and the work supporting table is arranged to slide longitudinally in front of the wheel. The cam grinding attachment is mounted upon this work table and carries the master cam shaft in axial alignment with the cam shaft to be ground. In the improved construction, I provide a control mechanism whereby movement of the work table relative to the base operates to rock the master cam from contact with the master cam roller into an inoperative position and to simultaneously move the master cam roller axially to bring it into alignment with the next master cam. This mechanism is so constructed and arranged that it will function when the table is moved in either direction, thereby making it possible to start grinding at the headstock end of the first cam shaft to be ground and move the table toward the left to grind successive cams. When the second cam shaft is inserted, the cam nearest the footstock end of the shaft is ground first and the table is moved toward the right to grind successive cams, thereby minimizing the time that is not used in the actual grinding operation.

As illustrated in the drawings, I provide a grinding machine having a base 11 carrying a wheel slide 12 which rotatably supports the grinding wheel 13. On the front portion of the base, I mount the table 15 which is adapted for a traversing movement longitudinally of the machine by means of a hand wheel 16, fixed on the outer end of the shaft 17. The inner end of the shaft 17 carries a pinion meshing with a rack (not shown) on the under side of the table 15. These parts are not shown as they are old and well known features of a grinding machine and are not considered as part of the present invention. The grinding wheel 13 may be fed toward and from the work supporting table 15 by any suitable well known feeding mechanism such for example as shown in the patent to Norton No. 762,838 of June 14, 1904.

In order that work of irregular cross-section may be ground, I may utilize any suitable mechanism whereby the work axis or the grinding wheel axis may be moved relative to each other during the grinding operation to generate the desired contour upon the piece of work. In the preferred construction, however, I mount the work supporting mechanism so that it may rock toward and from the face of the grinding wheel to produce the desired contour upon the shaft to be ground. As shown in the drawings, I mount the supporting brackets 20 and 21 on the upper surface of the table 15. The rock bar 22 has a pair of trunnions 23 and 24 projecting from its opposite ends. The trunnions 23 and 24 are supported for rotation in brackets 20 and 21 respectively. Upon the upper surface of the rock bar 22, I mount the headstock member 25 and the footstock 26. These members are provided with work supporting centers 31 and 32 to support the work piece during the grinding operation. The headstock 25 carries a driving member 27 adapted to engage a driving dog 29 which is clamped to one end of a cam shaft 28.

To transmit a rocking motion to the cam shaft 28 to cause a movement toward and from the grinding wheel to produce the desired contour, I may utilize any suitable mechanism. In the preferred construction, I mount a master cam shaft 30 on the headstock member 25 in axial alignment with the cam shaft to be ground. The cam shaft comprises a plurality of master cams which are shaped and timed to correspond with the cams which are to be produced on the finished cam shaft. In order that rotation of the master cams may rock the bar 22, I provide a bracket member 35 clamped to the table 15 to support a master cam roller or follower 36. The master cam roller 36 is slidably keyed to the shaft 37 which is rotatably supported in the bearings 38 and 39 depending from the bracket 35. From this construction, it will be readily apparent that rotation of the master cams 30, which are in alignment with the cam shaft 28, against the master cam roller 36 will cause a rocking motion of the bar 22 determined by the shape of the master cam, thereby moving the shaft being ground toward and from the grinding wheel to produce the desired contour on the cam shaft.

I may utilize any suitable driving mechanism to rotate the master cam shaft and shaft to be ground. In the preferred construction, I have illustrated a simplified drive which comprises a gear 40 mounted on a projecting end of the master cam shaft 30. The gear 40 in turn meshes with a gear 41 rotatably mounted on the trunnion 24 of the rock bar 22. Formed integrally with the gear 41 is a second gear 42. The gear 42 meshes with a pinion 43 on one end of a shaft 44. The other end of the shaft 44 carries a gear 45 meshing with a gear 46 on the drive shaft 47. The pulley 48 is mounted on the shaft 47 and is driven by a belt 49 from any suitable source of power. It will be readily seen from the foregoing description that the drive to the master cam by the belt 49 through the gears 46, 45, 43, 42, 41 and 40 on the master cam shaft permits rotation of the master cam shaft and the shaft to be ground during the rocking motion of the bar 22.

In order that the master cam 30 may be held in contact with the master cam roller 36, I provide a mechanism to yieldably maintain the master cam in contact with the periphery of the master cam roller. As shown in the drawings, I provide the rock bar 22 with a projecting arm 55. The lower end of a rod 57 is pivoted by means of a pin 56 to the outer end of the arm 55 and is slidably supported in the threaded bushing 58. The bushing 58 is screw-threaded into the supporting member 59 which is in turn pivoted to a bracket 60 projecting from the supporting member 21 by means of a stud 61. The cylinder 63 surrounds the rod 57 and is secured to the pivotally mounted supporting member 59 by means of screws 64 passing through the cylinder 63 and threaded into the supporting member 59. The upper end of the rod 57 is provided with a collar 66 which is rigidly fixed to the rod by means of a pin 62 and a nut 65 threaded on the end of the rod and is adapted to support the upper end of spring 68. The lower end of the spring 68 is supported by a collar 69 which is slidably mounted on the rod 57. This collar is supported against the upper face of the threaded bushing 58. The tension of the spring may be varied by adjusting the threaded bushing 58 relative to the supporting member 59 to increase or decrease the tension as desired. The tension of the spring 68 is exerted on the arm 55 to rock the bar 22 and thereby maintain the master cam 30 against the periphery of the master cam roller 36 with sufficient pressure to maintain operative contact therebetween during the grinding operation.

In order that the master cam 30 may be withdrawn from engagement with the follower 36 to permit the follower to be shifted into alignment with the next master cam, I may utilize any suitable mechanism to rock the bar 22 against the tension of the spring 68. In the preferred construction, I employ a fluid pressure mechanism comprising a cylinder chamber 70 in the upper portion of the cylinder 63 having a piston 71 slidably mounted within the chamber 70. This piston may be directly connected to the rod 57 so that it will slide within the cylinder as the rod moves relative thereto. In the preferred construction, however, as shown in Figs. 3 and 6, I construct the piston 71 as a separate member which is adapted to contact with the upper face of the collar 66. When fluid under pressure is admitted through the port 75 in the cylinder head 76, the piston 71 will be forced downwardly against the tension of the spring 68 to rock the bar 22 and withdraw the master cam 30 and the cam shaft 28 from contact with the master cam roller 36 and the grinding wheel 13 respectively. A stop ring 73 is fixed by means of screws 74 to the inner wall of the cylinder 63. This ring serves as a stop to limit the downward movement of the piston 71. After the table 15 has been traversed to bring the next cam on the cam shaft 28 into alignment with the grinding wheel 13, the fluid pressure within the chamber 70 is reduced and the released tension of the spring 68 moves the rod 57 upwardly to rock bar 22 and the master cam 30 into contact with the roller 36.

To operate the cylinder mechanism so as to automatically withdraw the cam at the proper time, I may utilize any suitable valve mechanism connected to operate the moving parts of the grinding machine. In my preferred construction, however, I provide a valve mechanism controlled by the table traverse mechanism. As illustrated in the drawings, I have shown a valve mechanism 77, having an inlet port 78 which is connected to a source of fluid pressure by means of a flexible pipe 79. The port 78 enters into a chamber 80 having an inlet valve 82 at its lower end. The valve 82 enters into a chamber 84 having an exhaust valve 83 at the other end thereof. These valves may be of any suitable construction but, as illustrated, I utilize a poppet valve construction. The inlet valve 82 is connected with a chamber 84 having an outlet port 85 which is connected by a flexible pipe 87 with a port 75 in the cylinder head 76. The valves are normally held in a closed position by springs 88 and 89 which are interposed between portions of the valve casing 81 and the collar 90 and 91 on the valve stems.

To actuate the valve mechanism in timed relation with the movement of the work table so that the rock bar may be withdrawn to remove the master cam 30 and the cam shaft 28 from contact with the master cam roller and the grinding wheel, I may utilize any suitable mechanism. As illustrated, I mount a bracket 93 on the base of the machine. The bracket 93 supports one end of a dog carrying member 94 while the other end is slidably supported in the projecting portion 95 of the bracket 35 (see Fig. 5). As the table 15 is traversed longitudinally, the bar 94 being fixed relative to the base remains stationary and the portion 95 slides along the bar. On the bar 94, I provide the dogs 96 which are spaced on the bar 94 corresponding to the spacing of the cams on the cam shaft 28. The dogs 96, as illustrated in the drawings, are fixed to the supporting bar 94 but if desirable, the dogs 96 may be constructed so that they may be adjusted longitudinally of the bar to vary the spacings to correspond with the spacing of cams on different cam shafts. A roller 98 is rotatably supported on a stud 99 on a lever 100. The lever 100 is pivoted by means of a stud 101 to the bracket 103 which is fixed to the portion 95 of the bracket 35. As the work table 15 is traversed longitudinally, the dogs 96 contact with the roller 98 so that as the rollers ride up over the dog, it raises the lever 100. As the lever 100 moves upwardly an adjustable screw 102 contacts with the lower end of the valve stem to open the valve 82. Opening valve 82 admits fluid under pressure through the port 85 and the flexible tube 87 into the cylinder chamber 70 and thereby forces the piston 71 downwardly to rock the master cam shaft 30 and the cam shaft 28 away from the master cam roller and grinding wheel. The other end of the lever 100 is provided with an adjustable screw 105 adapted to contact with the lower end of the valve stem to operate the exhaust valve 83 in timed relation with the inlet valve 82. As the dog 96 rides under the roller 98, the lever 100 will drop and permit the tension of spring 88 to close valve 82. As the lever 100 drops, the opposite end carrying screw 105 is raised so as to open the exhaust valve 83 and permit fluid under pressure to exhaust through the port 107. In order that the lever 100 may be normally held to maintain the valve 82 in closed position, I provide a spring 110 interposed between a projecting boss 111 on the bracket 35 and the end of the lever 100. The downward movement of the lever 100 is limited to a stop 112 projecting from the front of the bracket 35.

If it is desired to make the dogs 96 adjustable, they may be constructed with projecting studs 113 which are arranged to slide within a slot 114 in the bar 115. The studs 113 are each provided with a threaded portion at its lower end which is provided with a nut 116 and a washer 117 so that the dogs 96 may be adjusted longitudinally of the bar 115 and then locked in adjusted position by tightening the nut 116.

The master cam roller 36 may be moved axially to bring it into alignment with successive master cams by any suitable means. In the preferred construction, I utilize the traversing movement of the table 15 to move the follower roller 36 axially in timed relation with the movement of the rock bar 22. As illustrated in the drawings, the master cam follower 36 is slidably keyed to the guide rod 121 and is adapted to engage the side faces of the roller 36 to move it axially. In order that the roller may be moved in timed relation with the movement of the rock bar, I provide a rack 124 on the upper face of the yoked member 120. A cross shaft 125 is mounted in bearings 126 and 127 on the upper portion of the bracket 35. One end of the shaft 125 is provided with a gear 128 meshing with the rack 124. By turning the shaft 125, the yoked member 120 will move axially relative to the shaft 121 and carry the master cam roller 36 into alignment with the successive master cams. The other end of the shaft 125 is provided with a gear 130 meshing with a gear 131 on the stud 132. The gear 131 in turn meshes with a pinion 135 on the shaft 136 which carries a star wheel 137 on its outer end. The star wheel 137 is positioned and arranged to contact and be turned by the dogs 96.

The master cams are spaced equally on the master cam shaft 30 while on the cam shaft 28 to be ground the spacing is irregular. In order that the unequal motion of the table may be utilized to move the roller 36 axially through an equal distance, I connect the gearing to the star wheel 137 which is moved one division as each dog 96 engages it so that a partial rotation of the star wheel will be transmitted through the gearing to slide the roller 36 into alignment with the next master cam. The gears 130, 131 and 135 are of the proper ratio to transmit the required movement to the roller 36.

To limit the rotation of the star wheel per indexing movement, I may utilize any suitable indexing device. In the drawings, however, I have illustrated a simplified construction comprising a lever 139 pivoted to the bracket 35 by a stud 140. The lower end of the lever is provided with a pawl 141 which is adapted to engage the notches 142 in the star wheel 137. The pawl 141 is preferably held yieldably in contact with the star wheel 137, by a spring pressed plunger 143 in a casing 144 projecting from the front of the bracket 35. As the dogs 96 contact with and turn the star wheel 137, the pawl 141 will ride over the projection 138 of the star wheel 137 and will be forced into the next space in the wheel by the spring pressed plunger 143.

In the drawings, I have shown the mechanism as set up for grinding a cam shaft having six cams thereon. If it is desirable to vary this number of cams to be ground, I may change both the number of master cams and the number of dogs to operate the star wheel to whatever number is desired.

The operation of the mechanism will be readily apparent from the foregoing description. The cam shaft 28 is rotatably mounted on centers 31 and 32 between the headstock 25 and the foot stock 26 and is driven by a driving member 27. The grinding wheel 13 is fed towards the cam shaft 28 to grind the cam to the proper size. As the master cam shaft is rotated to drive the cam shaft 28, it also rocks the cam shaft 28 toward and from the grinding wheel to produce the desired contour on the cam being ground. After this cam has been sized, the operator turns the wheel feed mechanism (not shown) to remove the grinding wheel 13 from operative contact with the work. The operator then grasps and turns the traverse wheel 16 to slide the table 15 longitudinally on the machine which operates to rock the bar and move the master cam shaft 30 and cam shaft 28 out of operative relation with the master cam roller and grinding wheel respectively and also to move the master cam roller into position opposite the next master cam as the table is moved to position the next product cam opposite the grinding wheel. Movement of the table 15 carries the star wheel 137 and the roller 98 until they contact with the next dog 96. When the dog 96 strikes the roller 98, the lever 100 is raised to open the intake valve 82 and thereby force the piston 71 downwardly to rock the bar 22 so that the master cam 30 and cam shaft 28 are withdrawn from engagement with the master cam roller 36 and the grinding wheel 13. Then the dog 96 having entered a notch 142 of the star wheel 137 strikes a projection 138 to turn the gears 135, 131, 130 and 128 and index the master cam roller 36 axially into alignment with the next master cam. The motion of the star wheel then ceases and the continued movement of the table 15 brings the next cam on the cam shaft into alignment with the grinding wheel. After the roller 98 passes over the top of the dog 96, the lever 100 is forced downwardly by a spring 110 thereby permitting tension of the spring 85 to close the inlet valve 82. The downward movement of the lever 100 causes a raising of the other end of the lever to open the exhaust valve 83 which permits the fluid pressure to escape through the exhaust port 107. As the fluid is exhausted, the released tension of the spring 68 returned the rock bar to its operative position so that the next master cam 30 contacts with the master cam roller 36. The machine is now in position ready to grind the next cam on the shaft 28. The operator feeds the grinding wheel into the work to reduce it to proper size and then continues the cycle of operation until all of the cams on the shaft have been ground. The mechanism is so constructed and arranged that the operator may start and grind from one end of the cam shaft, taking successive cams until the other end of the shaft is reached. Then the operator replaces the cam shaft with a new shaft to be ground and in grinding the second shaft operates in the reverse direction, that is, on one shaft the cams are successively ground from headstock to footstock and on the next shaft from footstock to headstock.

This application is a division of the copending application Serial No. 187,067, dated April 27, 1927, which has issued as U. S. Patent No. 1,791,479.

Having thus described my invention, what I claim as new and desire to secure by Letters Patent is:

1. A cam grinding apparatus comprising a rotatable grinding wheel and a cam blank support for a cam shaft having a plurality of spaced cam blanks, said wheel and blank being relatively movable towards and from each other, means including a set of master cams and follower to cause such relative movement and produce contours predetermined thereby on the cam blanks, means to cause relative longitudinal traversing movement between the wheel and cam blanks to position the wheel in operative relation with a given cam blank, means to relatively index said master cams and follower and means actuated automatically by and in timed relation with said traversing movement to laterally separate the wheel and the cam blank support before said indexing movement takes place.

2. A cam grinding machine comprising a grinding wheel and a support for a cam shaft having a plurality of spaced cam blanks, said wheel and support being relatively movable towards and from each other, means including a set of master cams and a cam follower to cause such relative movement, manually operated traversing mechanism to move the cam blank support longitudinally to position the grinding wheel in front of the desired cam blank, means to index said follower relative to the master cams and means actuated automatically by and in timed relation with said traversing mechanism to separate the grinding wheel and cam blanks before said follower is indexed.

3. A cam grinding apparatus for cylindrical grinding machines comprising a rotatable grinding wheel, a table, mechanism to cause said table and wheel to be traversed longitudinally one relative to the other, a pivotally mounted work support on said table, means to rotate the work, means to rock said support during rotation of the work to produce the desired contour on said work, and fluid pressure mechanism actuated automatically by and in timed relation with said traversing mechanism to rock said support to an inoperative position to separate the wheel and work.

4. A cam grinding apparatus for cylindrical grinding machines comprising a table, means to traverse said table, a pivotally mounted work support on said table, a master cam rotatably mounted on said support, means to rotate said master cam, a master cam follower rotatably mounted on the table, yieldable means to normally maintain said master cam in contact with said follower, a fluid pressure piston and cylinder mechanism to rock said support to separate the master cam and follower, and a valve mechanism actuated by movement of the table to admit fluid under pressure to said cylinder.

5. A cam grinding apparatus for cylindrical grinding machines comprising a base, a table thereon, means to traverse said table, a pivotally mounted work support on said table, a master cam rotatably mounted on said support, means to rotate the cam, a master cam follower rotatably mounted on said table, yieldable means to maintain said master cam normally in contact with said follower, a fluid pressure piston and cylinder mechanism to rock said support to separate the master cam and follower, a valve mechanism to control the movement of said piston, and a dog mechanism actuated by movement of said table to operate said valve mechanism.

6. A cam grinding apparatus comprising support for a cam shaft having a plurality of cam blanks and a grinding wheel which are movable relatively transversely and towards and from each other, means including a set of master cams and a follower, which are relatively movable, arranged to move the wheel and cam blank relatively towards and from each other to grind the latter to the desired contour, mechanism for longitudinally moving the wheel and cam blank relatively to position the wheel in front of a desired blank, and means actuated automatically by and in timed relation with said mechanism to laterally separate the cam follower from one master cam and shift it longitudinally to another master cam corresponding with the cam blank selected.

7. A cam grinding apparatus for cylindrical grinding machines comprising a base, a rotatable grinding wheel, a table, means to traverse said table, a rock bar pivotally mounted on said table, a support for a cam shaft on said bar, a rotatable master cam shaft and a follower, one of which is mounted on the table and the other on the rock bar, a plurality of master cams on said shaft, means to rotate said shaft, which is so arranged that the work may be moved by said master cam, and automatic means operated by and in timed relation with the table traversing means to rock said bar to separate said master cam shaft and follower and to move said follower and master cams relatively in a direction to locate the follower opposite to another master cam.

8. A grinding machine for grinding cams or other irregularly shaped objects comprising a base, a grinding wheel slide thereon, a rotatable grinding wheel on said slide, a table on said base, means to traverse said table longitudinally on the base, a support for a cam shaft pivotally mounted on said table, a follower rotatably mounted on said table, a master cam on said support in axial alignment with said work, driving connections between said master cam and said work, means to rotate said master cam to cause a rotating and rocking movement to said support, and automatic means actuated by and in timed relation with said table traversing means to rock said support to an inoperative position and to move said follower axially into alignment with the next master cam.

9. A cam grinding machine comprising a base, a grinding wheel slide, a rotatable grinding wheel on said slide, a table mounted for longitudinal movement of said base, means to traverse said table, a cam shaft support pivotally mounted on said table, a master cam shaft on said support, a plurality of master cams on said shaft, a master cam follower on said table, driving connections between said shaft and work piece, yieldable means to maintain said master cam in contact with said follower during grinding, means to rotate said master cam shaft to rock said support to produce the desired contour on said work, and automatic means operated by movement of said table to rock said support, to move said master cam laterally out of contact with said follower and to move said follower axially into alignment with the next master cam.

10. A grinding machine comprising a rotatable grinding wheel, a work support movable towards and from the wheel and traversable longitudinally past the same, mechanism to traverse said support, and means including a fluid pressure actuated mechanism to remove the work support from a grinding position and a device for controlling the fluid flow to said mechanism which is operated by and in timed relation with the traversing mechanism.

11. A cam grinding apparatus comprising a base, a rotatable grinding wheel, a work supporting table, a rock bar pivotally mounted on said table, means to support a cam shaft having a plurality of spaced cam blanks on said bar, means including a set of master cams rotatably mounted on said bar in axial alignment with said cam shaft and a rotatable follower supported on said table to oscillate said bar and produce predetermined contours on a work blank, driving connections between said master cam and cam shaft, means to traverse said table longitudinally to position one of the cam blanks in operative relation with the grinding wheel, and means automatically actuated by and in timed relation with said table traversing mechanism to rock said bar laterally to separate the master cam and follower.

12. A cam grinding machine comprising a grinding wheel and a support for a cam shaft, having a set of cam blanks, mounted for relative movement toward and from one another to grind a cam, means including a longitudinally traversable table to move the wheel and work support relatively lengthwise of the cam shaft, a set of master cams and a follower operatively associated therewith, one of which is mounted on the movable support and the other on the table for relative axial movement, means to rotate said master cams and cam shaft, the rotation of the master cam serving to move said support and produce predetermined contours on the cam blanks being ground, and means automatically operated by and in timed relation with the movement of the table to separate the master cam and the follower, as well as the wheel and a cam blank, and then to position the follower in operative relation with another master cam and the wheel opposite to a new blank on the cam shaft.

Signed at Worcester, Massachusetts, this 15th day of August 1929.

WARREN F. FRASER.